United States Patent
Gebreselassie

[19]

[11] Patent Number: 6,103,343
[45] Date of Patent: Aug. 15, 2000

[54] TRIM PANEL HAVING ZIG ZAG FIBER CONSTRUCTION

[75] Inventor: Girma M. Gebreselassie, Southfield, Mich.

[73] Assignee: Lear Automotive Dearborn, Inc., Southfield, Mich.

[21] Appl. No.: 08/906,624

[22] Filed: Aug. 7, 1997

[51] Int. Cl.⁷ .................................................. B32B 5/14
[52] U.S. Cl. .......................... 428/171; 428/161; 428/173; 428/195; 428/213; 428/218; 428/292.1; 428/357
[58] Field of Search ................................. 428/171, 218, 428/161, 173, 357, 195, 292.1, 213; 264/122, 119, 125; 297/452.1

[56] References Cited

U.S. PATENT DOCUMENTS

| | | | |
|---|---|---|---|
| 4,426,340 | 1/1984 | Goller et al. ............................ | 264/29.1 |
| 4,851,283 | 7/1989 | Holtrop et al. .......................... | 428/284 |
| 5,492,662 | 2/1996 | Kargol et al. ........................... | 264/119 |

FOREIGN PATENT DOCUMENTS

| | | |
|---|---|---|
| 0229196 | 7/1987 | European Pat. Off. . |
| 0530100 | 8/1992 | European Pat. Off. . |
| 2074802 | 10/1971 | France . |

*Primary Examiner*—Deborah Jones
*Assistant Examiner*—Abraham Bahta
*Attorney, Agent, or Firm*—Brooks & Kushman P.C.

[57] ABSTRACT

An improved method for forming a vehicle trim panel, such as a headliner, utilizes a zig zag path to deposit fibrous pieces onto a fibrous layer to form part of the trim panel. In one method, the fibrous pieces are laid down in a zig zag pattern that does not extend across the entire lateral width of the layer. In this way, the designer can easily achieve selected areas having a greater amount of fibrous pieces. This allows the designer to achieve selected high density or thicker portions in the layer without requiring the entire layer to have the same amount of fibrous pieces. This results in greater control over the design of the layer, and also reduces the amount of fiber which must be utilized to form the layer.

8 Claims, 1 Drawing Sheet

TRIM PANEL HAVING ZIG ZAG FIBER CONSTRUCTION

BACKGROUND OF THE INVENTION

This invention relates to an improved construction for a fibrous layer used in vehicle trim panels.

In the prior art fibrous layers are utilized in vehicle trim panels. As one example, vehicle headliners have been proposed which have layers made up of a plurality of fibers joined together at intersections. One proposal is a combination of binder and non-binder fibers. A percentage of fibers are formed with a binder covering, and the remainder of the fibers are formed without the binder. The layer is constructed of a combination of these fibers. When the layer is heated, the binder melts providing an adhesive to secure the two types of fibers together.

The fibrous layers to date have utilized two basic constructions. In a first construction, a plurality of fibers are randomly mixed. The fibers are then needled through the thickness of the layer. Needling provides structure to the overall fiber layer.

In a second basic type of construction, a so-called "flat mat" construction is utilized wherein the fibers are laid down in angled paths extending from one lateral side of the layer to the opposed lateral side. The fibers are deposited from a known fiber depositing structure such as a nozzle. The large angled paths of the nozzle results in the fibers building up to form the layer. With either type prior art structures, there has typically been a general constant amount of material at any one location throughout the layer.

It is desirable in trim applications, and in particular in headliner applications to have different densities and thicknesses at different locations in the layer. As an example, it may be desirable to have a thinner high density portion at one portion of the headliner. It is also sometimes desired to have thicker portions at the outer periphery of a headliner. In general, the prior art has required that if it is desired to have a high density portion at one location on the layer, the entirety of the layer must be have sufficient mass to achieve the same high density. It has been somewhat difficult to have variable mass or variable thickness in the amount of material deposited into the layers with the prior art approaches. This has resulted in undesirable large material requirements.

SUMMARY OF THE INVENTION

In a disclosed embodiment of this invention, a fibrous layer has greater amounts of material deposited at certain locations on the layer than there is at other locations. Stated another way, the present invention relates to a layer formed of a plurality of fibrous pieces, wherein there are locations on the layer where there is a greater mass of the fibrous pieces. The layers are preferably incorporated in a vehicle trim panel, and most preferably into a headliner.

In a method according to the present invention, the fibers are placed down in a zig zag pattern which does not extend across the entire width of the layer. In this way, the mass of material can be controlled and placed selectively at desired locations on the layer. It is thus relatively easy to achieve higher density locations or thicker locations without requiring the entire layer to be formed of the same high mass of material.

In a layer made according to the inventive method, there thus may be higher density or thicker locations formed by depositing a greater amount of material. The present invention achieves a layer with the exact desired mass at each location, without requiring an undue amount of material to be utilized at locations where it is not necessary.

These and other features of the present invention can be best understood from the following specification and drawings, of which the following is a brief description.

DETAILED DESCRIPTION OF A PREFERRED EMBODIMENT

Figure 1:
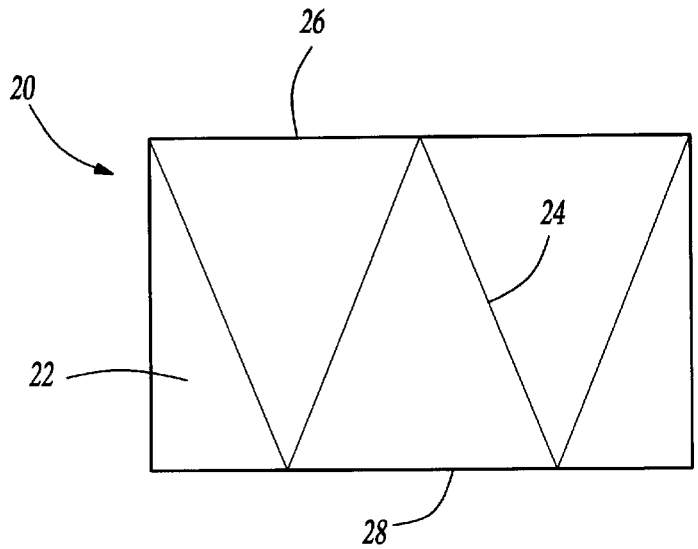
FIG. 1 shows a prior art construction.

FIG. 1 shows a prior art layer 22 of the type used in trim panel. As shown, fibrous material has been laid down in an series of angled paths 24. These paths extend from one lateral side 26 to an opposed lateral side 28 of layer 20. The paths 24 as shown schematically in FIG. 1 are repeated at a high rate such that, in combination, the paths build up the overall layer 22. With this process, should it be desired to have a relatively high density at one location on the panel, the entire panel must be made to include the same high amount of material and the high density area is then compressed. This process does not provide flexibility to achieve selective high thickness or high density locations with control of the mass deposited at other areas.

Figure 2:
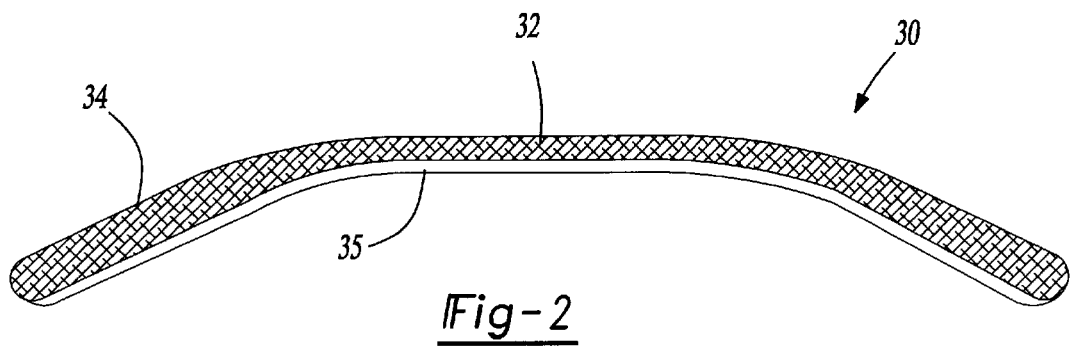
FIG. 2 is a cross-sectional view through a headliner.

FIG. 2 shows a cross-section of a headliner 30. As shown, outer areas 34 may be relatively thick. A central area 32 may be desirably of a high density, but thinner than outer areas 34. These features are shown as examples only. It may be desirable to have the higher density locations at outer areas of the headliner. This cross-section is merely meant to show that in some headliner applications it may be desired to have local and selective high density or thicker portions. The same is true for other types of trim panels. The method of the present invention is able to easily achieve these features.

The figure shows a fibrous layer 35 that provides the variable thickness or density. A cover material 36 may be placed on the layer 35. Other layers may also be interposed within the overall trim panel.

Figure 3:
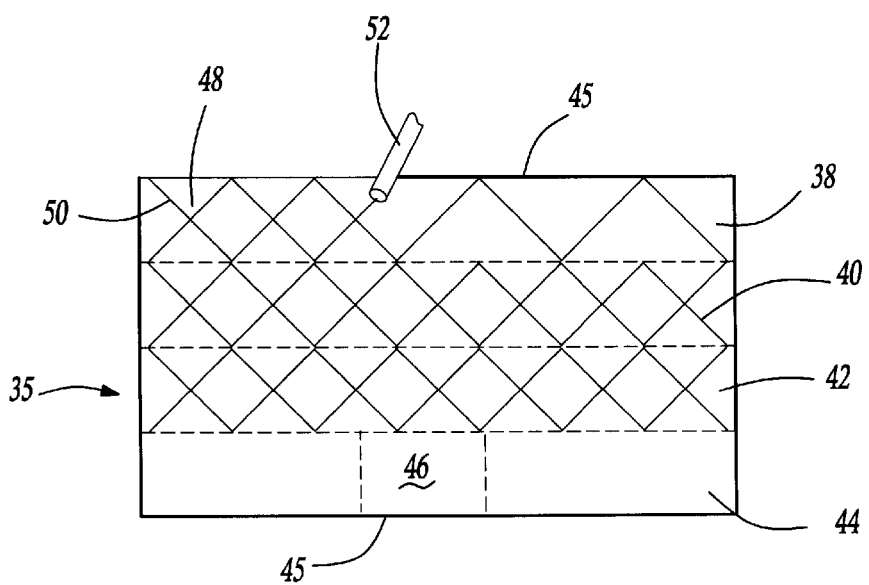
FIG. 3 schematically shows options provided by the inventive method for forming a panel.

FIG. 3 shows a method for forming a fibrous layer 35. As shown, fibrous layer 35 may have several sections 38, 40, 42 and 44 spaced between its two lateral sides 45. As also shown, there may be a section 46 within section 44 of a greater thickness than the remainder of section 44, and the other sections 38, 40 and 42. Alternatively, it may be that section 46 should be thinner, or have a different density than the remainder of the section. The present invention allows selection and control to achieve a desired density and/or thickness for each area within any section without wasted material mass.

As shown, the section 38 is being formed by depositing fibers along zig-zagged paths. The path 48 has already been laid down, and is a zig zag construction that extends from the one lateral end 45 to the end of the section 38. A second zig zag path 50 is now being laid down from a nozzle 52. Any method of laying down the fibers may be used. The nozzle is simply shown as one method. As can be seen, paths 48 and 50 do not extend between the two lateral ends 45. Rather, the paths only extend across a portion of layer 35. In this way, one can easily control the amount of material found in any one section of the layer 35.

As an example, should it be desired that the outer sections 38 and 44 have a greater thickness or greater density then central sections 40 and 42, then the outer sections are simply formed to have an increased number of paths of deposited fibers, or higher volume in the paths such that they received increased mass. By not utilizing the same high fiber mass in the central sections 40 and 42, the central sections 40 and 42 are left at a lower density or lower thickness.

The prior art, faced with the same design considerations, would have made all paths across the entire width of the layer, thus resulting in additional unnecessary material at the central locations 40 and 42. The high density portions would then be compressed.

Similarly, since only section 46 need be of the higher thickness, the path can repeatedly cycle through that limited portion to result in the higher density or higher thickness. The prior art method of extending across the entire lateral distance does not allow such a controlled design.

In summary, by selectively depositing the material in a zig zag pattern that only extends across a portion of the lateral width of the layer, the present invention achieves fine control over the deposition of the fibrous material. The method thus results in greater control over the final layer, greater utilization of fiber pieces, and less wasted material. the disclosed embodiments are an attempt to show the options provided by this method. The method can be applied to any trim panel design.

Layer 35 may also be formed from a base prior art-type layer formed by the method such as shown in FIG. 1. Alternatively, a mat that is needle punched, and has a more random deposition can also be utilized. The invention would occur when the deposition of a path which does not extend across the entire width of the layer is then utilized on the base layer to achieve selected high density or high thickness portions.

Once the layer is formed it is subjected to heat. The layer is then assembled with other layers of the final trim panel and molded. The molding results in the compression of the higher fiber piece areas to be compressed to high density areas and desired thicknesses.

The fibers may be polymeric fibers such as polyester, fiberglass, etc. Also, natural fibers may be mixed into the polymeric fibers.

A preferred embodiment of this invention has been disclosed, however, a worker of ordinary skill in the art would recognize that certain modifications would come within the scope of this invention. For that reason the following claims should be studied to determine the true scope and content of this invention.

What is claimed is:

1. A trim panel comprising:

a fibrous layer formed from a plurality of fiber pieces bonded together, said fibrous layer being formed to have a greater mass of fibrous pieces at certain locations than found at other locations;

wherein said fibrous layer is formed by depositing fiber pieces in zig zag paths, with more material deposited by said zig zag paths in said area which is to have the greater mass of fibrous pieces.

2. A trim panel as recited in claim 1, wherein said trim panel is a vehicle headliner.

3. A trim panel as recited in claim 1, wherein an outer decorative layer is placed on said trim panel.

4. A vehicle trim panel formed by the method of:

(1) depositing a plurality of fibrous pieces onto a surface to form a layer, said depositing of said fibrous pieces including depositing pieces in a path which does not extend across an entire width of said fibrous layer, and also such that an area on said layer is formed to have a greater mass of fibrous pieces than other areas on said layer.

5. A trim panel as recited in claim 4, wherein said path is formed in a zig zag pattern that does not extend across said entire width of said layer.

6. A trim panel as recited in claim 4, wherein said layer is formed entirely by utilizing paths of deposition which do not extend across said width of said layer.

7. A trim panel as recited in claim 4, wherein said areas of greater mass are of higher density than other areas.

8. A trim panel as recited in claim 4, wherein said areas of greater mass are thicker than other areas.

* * * * *